United States Patent
Zou et al.

(10) Patent No.: US 11,928,759 B2
(45) Date of Patent: Mar. 12, 2024

(54) METHODS AND DEVICES FOR VECTOR LINE DRAWING

(71) Applicants: Changqing Zou, Markham (CA); Mingxue Wang, Burnaby (CA); Himanshu Arora, Burnaby (CA)

(72) Inventors: Changqing Zou, Markham (CA); Mingxue Wang, Burnaby (CA); Himanshu Arora, Burnaby (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 4 days.

(21) Appl. No.: 17/724,452

(22) Filed: Apr. 19, 2022

(65) Prior Publication Data
US 2023/0334733 A1    Oct. 19, 2023

(51) Int. Cl.
*G06T 11/20*    (2006.01)
*G06F 3/04883*    (2022.01)
*G06T 11/00*    (2006.01)

(52) U.S. Cl.
CPC ........ *G06T 11/203* (2013.01); *G06F 3/04883* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 6,807,286 B1* | 10/2004 | Krumm | ................... | G06F 18/28 |
| | | | | 382/199 |
| 7,636,097 B1* | 12/2009 | Holloway | ................ | G09G 5/00 |
| | | | | 345/611 |
| 10,997,752 B1* | 5/2021 | Yoo | ........................ | G06T 11/001 |
| 2002/0008697 A1* | 1/2002 | Deering | .................. | G06T 5/002 |
| | | | | 345/418 |
| 2003/0063095 A1* | 4/2003 | Cheung | ................. | G06T 15/005 |
| | | | | 345/582 |
| 2003/0095701 A1* | 5/2003 | Shum | ..................... | G06V 40/16 |
| | | | | 382/190 |
| 2019/0139225 A1* | 5/2019 | Wang | ..................... | G06V 10/44 |
| 2021/0064858 A1* | 3/2021 | Batra | ........................ | G06N 3/08 |
| 2021/0158549 A1* | 5/2021 | Veeravasarapu | ....... | G06N 3/084 |
| 2021/0357113 A1* | 11/2021 | Mangu | ...................... | G06T 9/20 |
| 2022/0180043 A1* | 6/2022 | Tang | ................... | G06V 30/19173 |
| 2022/0189189 A1* | 6/2022 | Tang | .................... | G06V 10/454 |
| 2023/0162413 A1* | 5/2023 | Batra | ...................... | G06T 5/002 |
| | | | | 345/441 |

* cited by examiner

*Primary Examiner* — Jeffrey J Chow

(57) ABSTRACT

The present disclosure describes methods and devices for generating a vector line drawing. A vector line drawing network may include a machine learning-based model that is trained to convert a raster image to a vector line drawing directly. The vector line drawing network may be trained end-to-end, using supervised learning, where only raster images are used as training data. A vector line drawing is generated stroke by stroke, over a series of time steps. In each time step, a dynamic drawing window is moved and scaled across the input raster image to sample a patch of the raster image, and a drawing stroke is predicted to draw a stroke in a corresponding patch in the canvas for the vector line drawing. The image patches are pasted in the canvas to assemble a final vector line drawing that corresponds to the input raster image.

18 Claims, 8 Drawing Sheets

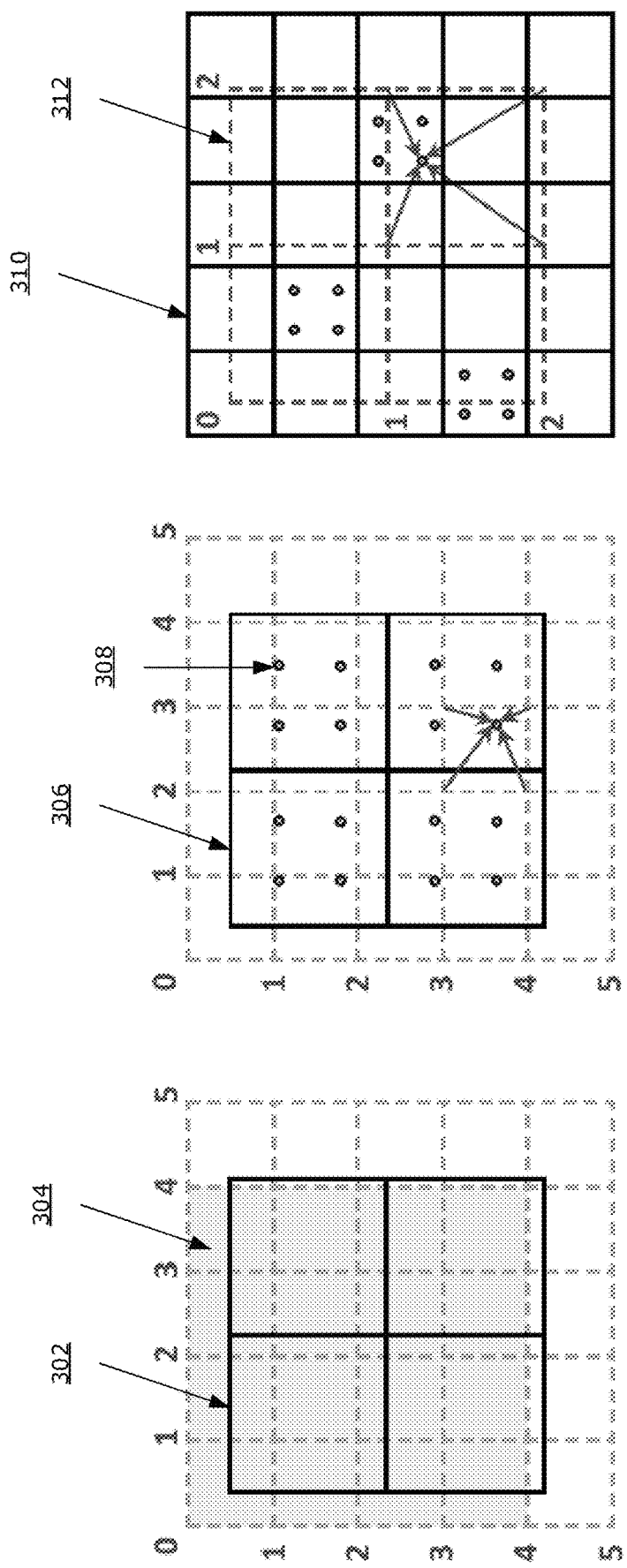

| Layer Type | Kernel Size | Stride | Normalization Function | Activation Function | Output |
| --- | --- | --- | --- | --- | --- |
| Input | - | - | - | - | 10 × 128 × 128 |
| CoordConv | - | - | - | - | 12 × 128 × 128 |
| Convolutional | 3 × 3 | 2 | Instance Norm. | ReLU | 32 × 64 × 64 |
| Convolutional | 3 × 3 | 1 | Instance Norm. | ReLU | 32 × 64 × 64 |
| Convolutional | 3 × 3 | 2 | Instance Norm. | ReLU | 64 × 32 × 32 |
| Convolutional | 3 × 3 | 1 | Instance Norm. | ReLU | 64 × 32 × 32 |
| Convolutional | 3 × 3 | 2 | Instance Norm. | ReLU | 128 × 16 × 16 |
| Convolutional | 3 × 3 | 1 | Instance Norm. | ReLU | 128 × 16 × 16 |
| Convolutional | 3 × 3 | 1 | Instance Norm. | ReLU | 128 × 16 × 16 |
| Convolutional | 3 × 3 | 2 | Instance Norm. | ReLU | 256 × 8 × 8 |
| Convolutional | 3 × 3 | 1 | Instance Norm. | ReLU | 256 × 8 × 8 |
| Convolutional | 3 × 3 | 1 | Instance Norm. | ReLU | 256 × 8 × 8 |
| Convolutional | 3 × 3 | 2 | Instance Norm. | ReLU | 512 × 4 × 4 |
| Convolutional | 3 × 3 | 1 | Instance Norm. | ReLU | 512 × 4 × 4 |
| Convolutional | 3 × 3 | 1 | Instance Norm. | ReLU | 512 × 4 × 4 |

FIG. 4B

| Layer Type | Kernel Size | Activation Function | Output |
|---|---|---|---|
| Input | - | - | 10 |
| Fully Connected | - | ReLU | 512 |
| Fully Connected | - | ReLU | 1024 |
| Fully Connected | - | ReLU | 2048 |
| Fully Connected | - | ReLU | 4096 |
| Reshape | - | - | 16 × 16 × 16 |
| Convolutional | 3 × 3 | ReLU | 32 × 16 × 16 |
| Convolutional | 3 × 3 | - | 32 × 16 × 16 |
| Pixel Shuffle | - | - | 8 × 32 × 32 |
| Convolutional | 3 × 3 | ReLU | 16 × 32 × 32 |
| Convolutional | 3 × 3 | - | 16 × 32 × 32 |
| Pixel Shuffle | - | - | 4 × 64 × 64 |
| Convolutional | 3 × 3 | ReLU | 8 × 64 × 64 |
| Convolutional | 3 × 3 | - | 4 × 64 × 64 |
| Pixel Shuffle | - | Sigmoid | 1 × 128 × 128 |

FIG. 5B

METHODS AND DEVICES FOR VECTOR LINE DRAWING

FIELD

The present disclosure relates to the field of vector drawing, in particular methods and devices for converting raster images into vector images.

BACKGROUND

Line art or line drawings are images that consist of straight or curved lines arranged to represent a 2D or 3D object, where the image is generally presented on a uniform background and is devoid of artistic elements such as shading, gradients or color. Line art is often represented by vector images, which consist of points, lines, curves and shapes that are represented by mathematical formulas. Vector line drawings have the advantage of being easy to edit and scale, since the mathematical expressions describing the drawing can be adjusted to cause the image to be larger or smaller without any loss to image quality. In contrast, raster images consist of a grid of pixels and can be more difficult to edit and scale. Raster images are often generated by cameras or scanners, whereas vector graphics may be generated by vector illustration software.

Line art is an important tool in graphic design, however it can be tedious to create in vector illustration software. Often, drawings such as hand-drawn sketches may need to be converted into vector line drawings to enable easier editing and modification. It is common to take a photograph or scan hand-drawn sketches or line drawings to a raster image, and then convert the raster image to a vector line drawing using a vectorization software. However, in many cases, existing vectorization software require that input raster images are clean line drawings on a white background, and free of shading or other elements. It is not uncommon to require a two-step process to convert raster images to vector line drawings, where the first step is to clean the rough raster image (i.e., a raster image that may not be free of shading, rough marks, etc.), for example using image-to-image translation methods, and where the second step may be to vectorize the cleaned raster image, often as a separate post-processing step and using a separate vectorization software tool.

Accordingly, it would be useful to provide a method and system for converting rough raster images (e.g., of any resolution), directly to vector line drawings without first requiring a step to clean the raster images.

SUMMARY

In various examples, the present disclosure describes methods and devices for generating a vector line drawing. A vector line drawing network may include a machine learning-based model, such as a model based on a recurrent neural network (RNN) that is trained to convert a raster image to a vector line drawing directly. In particular, the vector line drawing network may be trained end-to-end, using supervised learning, where only raster images are used as training data rather than requiring vector drawings for supervised learning. A vector line drawing is generated stroke by stroke, over a series of time steps. In each time step, a dynamic drawing window is moved and scaled across the input raster image to sample a patch of the raster image, and a drawing stroke is predicted to draw a stroke in a corresponding patch in the canvas for the vector line drawing. The image patches are pasted in the canvas to assemble a final vector line drawing that corresponds to the input raster image.

In some examples, the disclosed vector line drawing network is designed with differentiable modules, to enable end-to-end training using gradients. A benefit of using differentiable modules is that the vector line drawing network can be trained using supervised learning, so that the generated vector line drawing corresponds to the input raster image with a suitable level of accuracy.

In various examples, the present disclosure provides the technical advantage that a vector line drawing is obtained, using rough, non-cleaned raster images of line drawing sketches or photographs of arbitrary resolution as inputs, without requiring a prior step of cleaning the raster images.

In some examples, a benefit of the present disclosure is that the vector line drawing is achieved with greater computational efficiency compared to existing techniques. Using a dynamic drawing window that is moved and scaled at each time step allows the vector line drawing network to generate vector line drawings from raster images of arbitrary resolution or complexity, with reduced computational difficulty.

In some examples, the present disclosure provides the technical advantage that the vector line drawing is generated using continuous strokes, where the continuous strokes favor fewer, longer strokes and minimize the number of smaller, short strokes or redundant strokes. Using fewer strokes to represent a line drawing reduces the complexity of the line drawing and simplifies editing within vector illustration software.

In some examples, a benefit of the present disclosure is that in generating continuous strokes, the stroke order is obtained.

In some aspects, the present disclosure describes a method for generating vector line drawings. The method comprises a number of steps. The method includes: obtaining an input image, the input image being a raster image of a ground-truth drawing; initiating a blank canvas image equal in size to the input image; using a vector line drawing network, generating a vector line drawing over a series of time steps by, for each time step in the series of time steps: obtaining a defined window position and a defined window size and defining a dynamic drawing window accordingly; cropping an image patch from the input image corresponding to the dynamic drawing window; cropping a canvas patch from the canvas image corresponding to the dynamic drawing window; generating, using a stroke generator, a stroke action for a current time step, wherein the image patch and the canvas patch are provided as inputs to the stroke generator, the stroke action including positional values for computing a set of stroke parameters; defining the defined window position and the defined window size for a next time step based on the stroke action generated for the current time step; rendering a rendered stroke image using the set of stroke parameters computed from the positional values; and pasting the rendered stroke image on to the canvas image based on the position and size of the dynamic drawing window; and outputting the generated vector line drawing.

In the preceding example aspect of the method, wherein the stroke action for the current time step is a vector containing one or more action parameters for a predicted drawing stroke for the current time step in the series of time steps, the action parameters including at least one of: an offset with respect to a current position of a virtual pen; an intermediate control point; a width factor, the width factor describing the line thickness for the predicted drawing stroke; a scaling factor, the scaling factor defining the defined size of the dynamic window; or a pen state parameter of the virtual pen.

In the preceding example aspect of the method, wherein the pen state parameter indicates whether the predicted drawing stroke is drawn in the canvas or whether the predicted drawing stroke is a movement of the dynamic drawing window to a different region of the input image without drawing the predicted drawing stroke in the canvas.

In the preceding example aspect of the method, wherein the predicted drawing stroke is a curve, the curve defined by one or more stroke parameters computed from the stroke action.

In some example aspects of the method, wherein in cropping an image patch and cropping a canvas patch based on the position and size of the dynamic drawing window, the method may further include: resampling the dynamic drawing window into spatial bins based on the size of the dynamic drawing window and a resampling size; setting sampling points inside each bin; computing values for the sampling points by bilinear image interpolation; and extracting an image patch and a canvas patch.

In some example aspects of the method, wherein in pasting the rendered stroke image on to the canvas image based on the position and size of the dynamic drawing window, the method may further include: defining a secondary coordinate system for the rendered stroke image; resampling the rendered stroke image into spatial bins based on the size of the dynamic drawing window and a resampling size; setting sampling points inside each bin; computing values for the sampling points by bilinear image interpolation; and pasting the resampled rendered stroke image on to the canvas image.

In the preceding example aspect of the method, wherein the vector line drawing network is a recurrent neural network, the recurrent neural network producing a plurality of consecutive drawing strokes, the consecutive drawing strokes being ordered by the order in which a respective rendered stroke image is pasted on to the canvas image.

In some example aspects of the method, wherein end-to-end training of the vector line drawing network includes the calculation of an overall loss function, the overall loss function comprising at least one of: the raster loss for visual raster-only supervision; an out-of-bounds penalty loss; or a stroke regularization loss.

In the preceding example aspect of the method, wherein calculating the raster loss includes the calculation of a normalized perceptual loss function, the perceptual loss function comparing a rendered line drawing and the target line drawing for a set of layers associated with a differentiable renderer.

In the preceding example aspect of the method, wherein calculating the stroke regularization loss includes calculating a stroke regularization term, the stroke regularization term being proportional to the number of drawn strokes, the stroke regularization loss acting to minimize the total number of drawn strokes by encouraging the production of longer drawing strokes over shorter drawing strokes and discouraging the production of redundant drawing strokes.

In some example aspects, the present disclosure describes a device for generating vector line drawings, the device comprising a processor configured to execute instructions to cause the device to: obtain an input image, the input image being a raster image of a ground-truth drawing; initiate a blank canvas image equal in size to the input image; using a vector line drawing network, generate a vector line drawing over a series of time steps by, for each time step in the series of time steps: obtain a defined window position and a defined window size and defining a dynamic drawing window accordingly; crop an image patch from the input image corresponding to the dynamic drawing window; crop a canvas patch from the canvas image corresponding to the dynamic drawing window; generate, using a stroke generator, a stroke action for a current time step, wherein the image patch and the canvas patch are provided as inputs to the stroke generator, the stroke action including positional values for computing a set of stroke parameters; define the defined window position and the defined window size for a next time step based on the stroke action generated for the current time step; render a rendered stroke image using the set of stroke parameters computed from the positional values; and paste the rendered stroke image on to the canvas image based on the position and size of the dynamic drawing window; and output the generated vector line drawing.

In another example aspect, the present disclosure describes a computer readable medium having instructions encoded thereon, wherein the instructions, when executed by a processing unit of a system, cause the system to perform any of the preceding example aspects of the method.

BRIEF DESCRIPTION OF THE DRAWINGS

Reference will now be made, by way of example, to the accompanying drawings which show example embodiments of the present application, and in which:

FIG. 3A-3C provide examples of cropping and pasting operations, in accordance with examples of the present disclosure;

FIG. 4B is a table representing an example architecture for a Convolutional Neural Network (CNN) encoder within the stroke generator, in accordance with examples of the present disclosure;

FIG. 5B is a table representing an example architecture for a differentiable renderer, in accordance with examples of the present disclosure.

Similar reference numerals may have been used in different figures to denote similar components.

DETAILED DESCRIPTION

Figure 1:
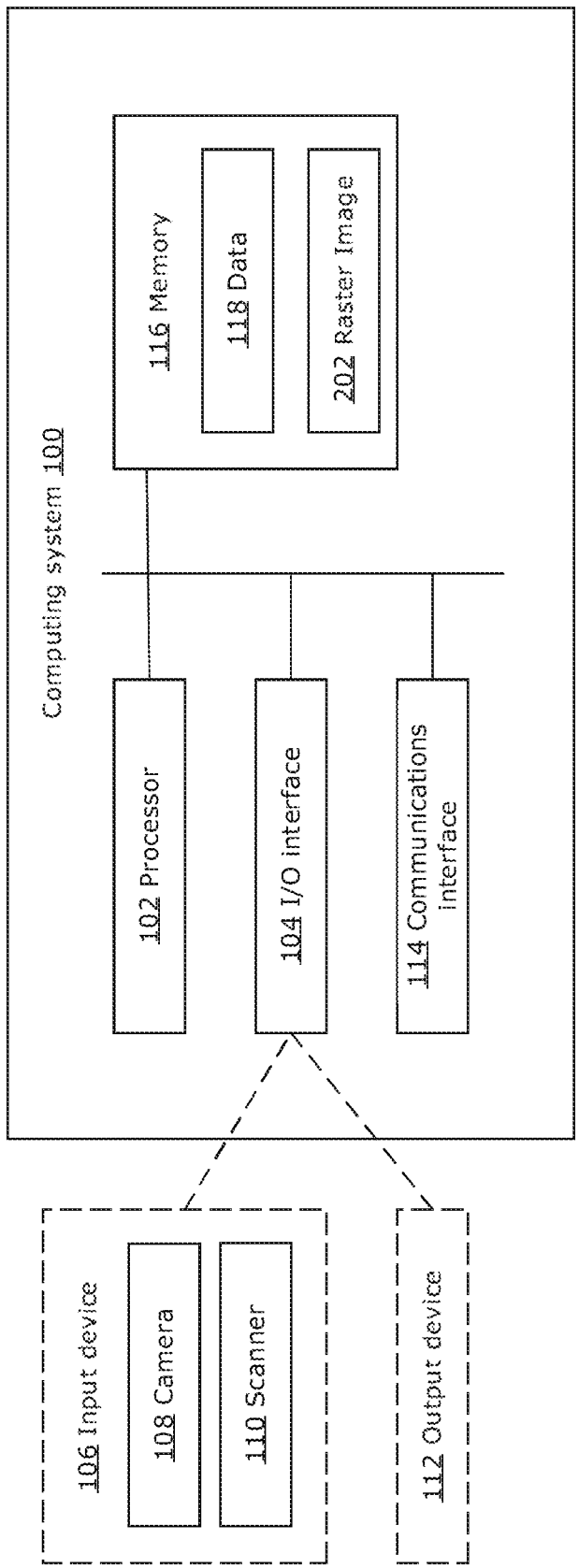
FIG. 1 is a block diagram illustrating an example hardware structure of a computing system that may be used for implementing methods to generate vector line drawings, in accordance with examples of the present disclosure.

The following describes example technical solutions of this disclosure with reference to accompanying drawings.

In various examples, the present disclosure describes methods and devices for generating a vector line drawing. A vector line drawing network may include a machine learning-based model, such as a model based on a recurrent neural network (RNN) that is trained to convert a raster image to a vector line drawing directly. In particular, the vector line drawing network may be trained end-to-end, using supervised learning, where only raster images are used as training data rather than requiring vector drawings for supervised learning. A vector line drawing is generated stroke by stroke, over a series of time steps. In each time step, a dynamic drawing window is moved and scaled across the input raster image to sample a patch of the raster image, and a drawing stroke is predicted to draw a stroke in a corresponding patch in the canvas for the vector line drawing. The image patches are pasted in the canvas to assemble a final vector line drawing that corresponds to the input raster image.

To assist in understanding the present disclosure, some existing techniques for generating vector line drawings are now discussed.

Vector line drawings, which consist of points, lines, curves and shapes that are represented by mathematical formulae may be generated using a number of computerized methods. Three common approaches include: vector graphics generation, vectorization and line generation. Vector graphics generation approaches commonly use neural network modeling to reconstruct images with supervision from vector-based training data, which may be difficult or time consuming to assemble.

Vectorization approaches may be defined as processes of directly converting raster image data (for example pixel color information) into simple geometric objects. For example, segmenting a raster image into a collection of paths and defining each path as a vector object. In some cases, strokes may be traced by least-square curve fitting methods. Typically, existing vectorization approaches are designed for converting clean raster images to vector line drawings and perform poorly on rough sketches (i.e., raster images that may not have a clean white background and that may include shading or other rough marks). In some cases, rough sketches may first be converted into clean raster images using vector line drawing generation before employing vectorization.

Existing vector line drawing generation approaches typically convert rough sketches or photographs into clean line drawings. Rough sketches may include groups of multiple lines representing one aspect of a drawing that need to be simplified into one representative line. Rough sketches may be raster images or vector images. In some existing approaches, rough vector sketches may be accepted as input and clean vector line drawings may be outputted. In some other existing approaches, rough raster images may be inputted and clean raster line drawings may be outputted. However, existing techniques are generally unable to output clean vector line drawings directly from rough raster images.

The present disclosure describes examples that may help to address some or all of the above drawbacks of existing technologies.

To assist in understanding the present disclosure, the following describes some concepts relevant to neural networks, and particularly recurrent neural networks (RNNs) and convolutional neural networks (CNNs) for the purpose of image processing, along with some relevant terminology that may be related to examples disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, ... n, n is a natural number greater than 1, $W_s$ is a weight of $x_s$, b is an offset (i.e. bias) of the neuron and f is an activation function of the neuron and used to introduce a nonlinear feature to the neural network, to convert an input of the neuron to an output denoted as h.

A neural network may be constructed in layers, including an input layer that accepts inputs, an output layer that generates a prediction as output, and a plurality of hidden layers which are situated between the input layer and output layer. The output of the activation function in one layer may be used as an input to a neuron of a subsequent layer in the neural network. In other words, an output from one neuron may be an input to another neuron. Different activation functions may be used for different purposes in a neural network, with hidden layers commonly using different activation functions than output layers. For example, a rectified linear unit (ReLU) is a commonly used activation function for hidden layers due to its computational efficiency during training. ReLU will directly pass an input to an output if the input is positive, otherwise the output is zero.

A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer may follow a linear relational expression: $\vec{y}=a(W\vec{x}+\vec{b})$, where $\vec{x}$ is an input vector, $\vec{y}$ is an output vector, $\vec{b}$ is an offset vector, W is a weight (also referred to as a coefficient), and a(·) is an activation function. At each layer, the operation is performed on an input vector $\vec{x}$, to obtain an output vector $\vec{y}$. The weights may be referred to as parameters of the neural network, the optimal values of which may be learned by training the neural network. Training of the neural network is a process of learning the weight matrix. A purpose of the training is to obtain a trained weight matrix, which consists of the learned weights W of all layers of the neural network.

Before a neural network can be trained, the initial weights need to be set. For example, an initialization function such as random or Gaussian distributions may define initial weights. For example, a Gaussian distribution with zero mean and variance that is proportional to the inverse of the number of weights of each layer may be used.

In the process of training a neural network, two approaches are commonly used: supervised learning and unsupervised learning. In unsupervised learning, the neural network is not provided with any information on desired outputs, and the neural network is trained to arrive at a set of learned weights on its own. In supervised learning, a predicted value outputted by the neural network may be compared to a desired target value (e.g., a ground truth value). A weight vector (which is a vector containing the weights W for a given layer) of each layer of the network is updated based on a difference between the predicted value and the desired target value. For example, if the predicted value outputted by the neural network is excessively high, the weight vector for each layer may be adjusted to lower the predicted value. This comparison and adjustment may be carried out iteratively until a convergence condition is met (e.g., a predefined maximum number of iterations has been performed, or the weight vector converges). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the neural network is to minimize the loss function.

Backpropagation is an algorithm for training a neural network. Backpropagation is used to adjust (also referred to as update) a value of a parameter (e.g., a weight) in the network, so that the error (or loss) in the output becomes smaller. For example, a defined loss function is calculated, from forward propagation of an input to an output of the neural network. Backpropagation calculates a gradient of the loss function with respect to the parameters of the network, and a gradient algorithm (e.g., gradient descent) is used to update the parameters to reduce the loss function. Backpropagation is performed iteratively, so that the loss function is converged or minimized.

A recurrent neural network (RNN) is a neural network that is designed to recognize sequential data and make predictions on the next likely scenario. RNNs have an internal memory that remembers inputs, thereby allowing previous outputs to be fed back into the network and information to be passed from one step to the next. RNNs are commonly used in applications with temporal components such as speech recognition, translation, captioning and drawing.

RNNs may employ a long short-term memory (LSTM) architecture which contain "cells" within the hidden layers of the neural network. The cells employ various gates (for example, input gate, output gate and a forget gate) which facilitate long-term memory and control the flow of information needed to make predictions.

A convolutional neural network (CNN) is a neural network that is designed to find the spatial relationship in data. CNNs are commonly used in applications related to computer vision for the purposes of classification, regression, segmentation and/or object detection. Stroke The CNN includes a feature extractor consisting of a convolutional layer and a sub-sampling layer. The convolutional layer consists of kernels or filters that are convolved with a two-dimensional (2D) input image to generate feature maps or feature representations using a trainable filter.

The convolutional layer is a layer of neurons at which convolution processing is performed on an input in the CNN. In a convolutional layer, one neuron may be connected only to a subset of neurons (i.e., not all neurons) in neighboring layers. That is, a convolutional layer generally is not a fully connected layer. One convolutional layer usually generates several feature maps using a convolutional kernel. Typically, a convolutional kernel is a 2D matrix of weights. It should be understood that the convolutional kernel may be unrelated to a manner and position of image information extraction. A plurality of convolutional kernels may be used at the same convolutional layer to extract different image information. Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

Standard Convolution operations used in convolutional layers are parameterized by kernel size, the number of kernels, padding and stride. The stride parameter controls the degree of movement of a kernel over an input image. Stride is represented in terms of the number of pixels the kernel will shift at each convolution step. When a stride is greater than 1, the output feature map reduces in size. The output dimensions resulting from applying standard convolution to an input image is computed using the following equation:

$$\text{Output} = \frac{W - F + 2*P}{N}$$

where W is the input image size, F denotes the filter size, P denotes padding, and N denotes the value of stride.

In addition to convolutional layers, a typical CNN architecture may also include pooling layers and normalization layers. Pooling layers reduce the spatial size of the feature maps (i.e. feature representations), thereby reducing the number of parameters and required computation of the network. Pooling layers are generally applied after a convolutional layer and operate on each feature map (i.e. feature representation) separately. These layers may reduce the size by averaging neighboring elements (in the case of an Average Pooling Layer) or by selecting the maximum value within a local window (in the case of a Max Pooling Layer). Pooling increases the receptive field of a neuron, increasing the network's performance for some tasks. Layer normalization acts to normalize the distributions of hidden layers in a CNN network. Layer normalization has a regularization effect, which can reduce overfitting and improves generalization. Instance normalization (also known as contrast normalization) is one normalization approach that may be used to reduce the impact of image contrast in input content by normalizing the distribution of each element of a batch independently. For example, a mean and variance may be calculated for each individual channel for each individual sample across both spatial dimensions.

In some examples, a neural network may be conceptually divided into two parts, the first being an encoder and the second being a decoder. The role of an encoder is to convert data (for example, an image) into a set of features having a defined format, such as a vector of fixed length (sometimes referred to as a feature vector), while the role of a decoder is to map the feature information encoded in the fixed-length vector to an output to make accurate predictions for the target (e.g. output image).

In the present disclosure, a "raster image" is defined as an image that is created by a rectangular grid of pixels, where each pixel has an associated value (e.g., a RGB color code, greyscale value). Raster images are commonly referred to as bitmaps. Raster images can capture fine details of an image down to the pixel level, however they may be more difficult to edit. When a raster image is enlarged, the individual pixels may become visible, edges may appear jagged or fuzzy and image quality is reduced.

In the present disclosure, a "vector line drawing" is defined as an image that is composed of points, lines, curves and shapes that are described by mathematical formulas. Vector line drawings have the advantage of being easy to edit and scale, since the mathematical expressions describing the image can be adjusted to cause the image to be larger or smaller without any loss to image quality.

In the present disclosure, "line art" or "line drawings" are defined as images that consist of straight or curved lines arranged to represent a 2D or 3D object, where the image is generally presented on a uniform background and is devoid of artistic elements such as shading, gradients or color.

In the present disclosure, "clean line art" or a "clean sketch" is defined as a line drawing where the drawing is composed of single, crisp lines that are connected to form a drawing. A clean sketch is in contrast to a "rough sketch," where groupings of multiple lines, including redundant lines, unwanted lines or disconnected lines may be used to create a likeness of a drawing.

In the present disclosure, a "feature extractor" is defined as a component of a neural network (e.g., a CNN) that extracts a set of derived values (i.e. features) from input data, such that the derived values contain information that is relevant to a task performed by the neural network, often with reduced dimensionality compared to the input data. The feature extractor transforms input data into a set of features with reduced dimensionality (also referred to as a feature representation) and a desired task (e.g., a prediction task) may then be performed on this representation.

In the present disclosure, a "feature map" or "feature representation" is defined as the result of applying a feature extractor to an input image. For example, an output of a convolution layer of a CNN may be a feature map. A feature map may be considered to be a type of feature representation where the features are structured in a matrix format (hence "mapping" onto an image).

FIG. 1 is a block diagram illustrating an example hardware structure of a computing system 100 that is suitable for implementing embodiments described herein. Examples of the present disclosure may be implemented in other computing systems, which may include components different from those discussed below. The computing system 100 may be used to execute instructions for generating vector line drawings, using any of the examples described herein. The computing system 100 may also be used to train the vector line drawing network, or the vector line drawing network may be trained by another computing system.

Although FIG. 1 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single end user device, single server, etc.), or may comprise a plurality of physical machines or devices (e.g., implemented as a server cluster). For example, the computing system 100 may represent a group of servers or cloud computing platform providing a virtualized pool of computing resources (e.g., a virtual machine, a virtual server).

The computing system 100 includes at least one processor 102, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an input/output (I/O) interface 104, which may enable interfacing with an optional input device 106 and/or an optional output device 112. In the example shown, the optional input device 106 (e.g., a keyboard, a mouse, a microphone, a touchscreen, and/or a keypad) may also include a camera 108 or a scanner 110. In the example shown, the optional input device 106 and optional output device 110 (e.g., a display, a speaker and/or a printer) are shown as optional and external to the computing system 100. In other example embodiments, there may not be any input device 106 and output device 112, in which case the I/O interface 104 may not be needed.

The computing system 100 may include an optional communications interface 114 for wired or wireless communication with other computing systems (e.g., other computing systems in a network). The communications interface 114 may include wired links (e.g., Ethernet cable) and/or wireless links (e.g., one or more antennas) for intra-network and/or inter-network communications.

The computing system 100 may include one or more memories 116 (collectively referred to as "memory 116"), which may include a volatile or non-volatile memory (e.g., a flash memory, a random access memory (RAM), and/or a read-only memory (ROM)). The non-transitory memory 116 may store instructions for execution by the processor 102, such as to carry out examples described in the present disclosure. For example, the memory 116 may store instructions for implementing any of the networks and methods disclosed herein. The memory 116 may include other software instructions, such as for implementing an operating system (OS) and other applications/functions.

The memory 116 may also store other data 118, information, rules, policies, and machine-executable instructions described herein, including raster images 202 captured by the camera 108 or scanner 110.

In some examples, the computing system 100 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 116 to implement data storage, retrieval, and caching functions of the computing system 100. The components of the computing system 100 may communicate with each other via a bus, for example.

Figure 2:
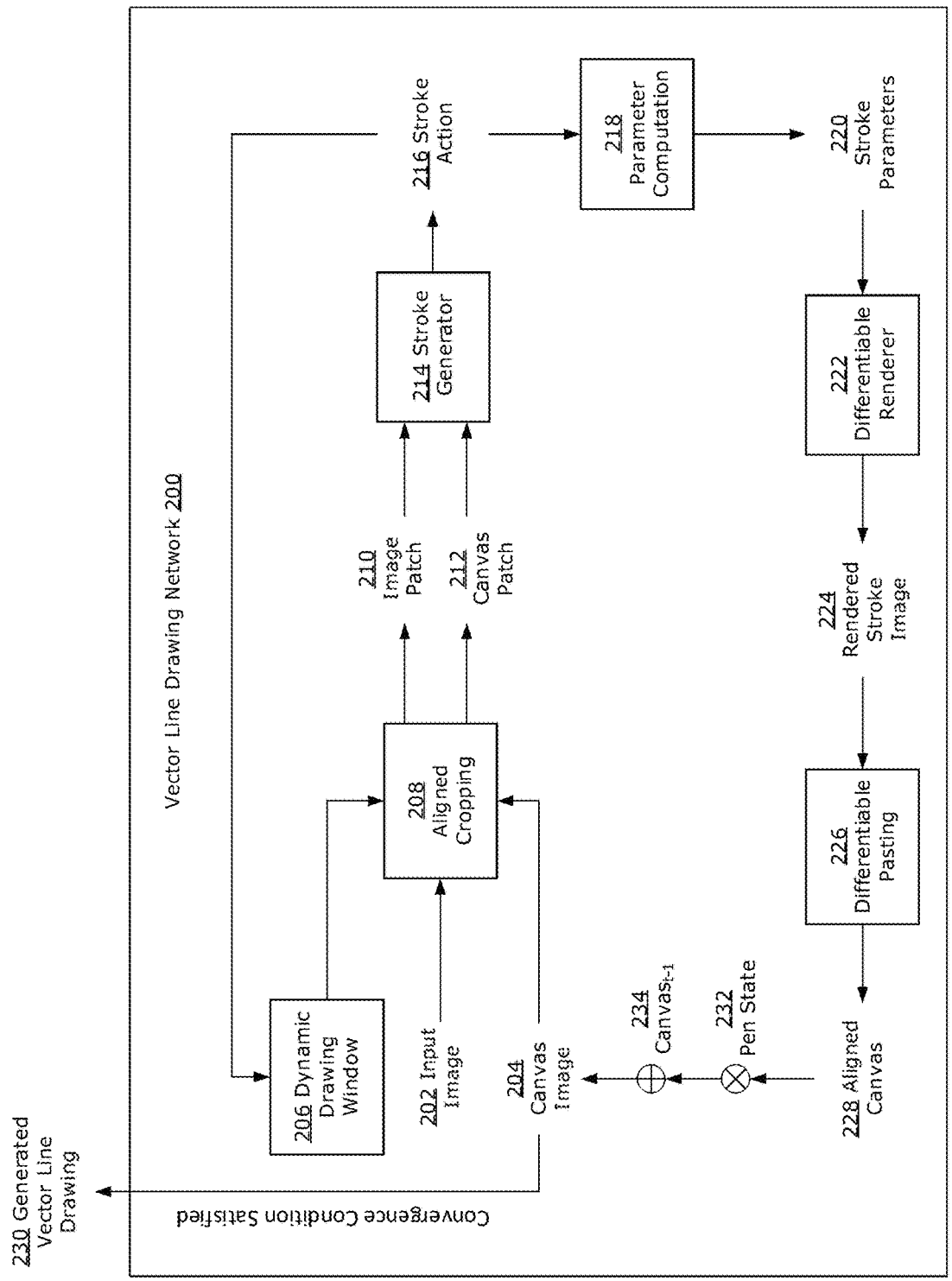
FIG. 2 is a block diagram illustrating an example architecture of a vector line drawing network that may be used to generate vector line drawings, in accordance with examples of the present disclosure.

FIG. 2 is a block diagram illustrating an example architecture of the vector line drawing network 200 that may be used to generate vector line drawings, in accordance with examples of the present disclosure. For example, the vector line drawing network 200 may be implemented by the computing system 100 of FIG. 1, in which the processor 102 is configured to execute instructions stored in the memory 116 to cause the computing system 100 to implement the vector line drawing network 200. As well, parameters of the vector line drawing network 200 (e.g., learned weight values) may be stored as data 118 in the memory 116.

In some examples the vector line drawing network 200 may be based on a trained RNN that iteratively predicts drawing strokes at each time step t in a series of time steps, to generate a full resolution vector line drawing 230 that resembles an input image 202, the input image 202 being a raster image. The input image 202 may be a raster image of arbitrary resolution. The input image 202 may be captured by a camera 108 or a scanner 110 on the computing system 100 or may be a digital image taken by another camera or scanned by another scanner on another electronic device and communicated to the computing system 100. The input image 202 may not need to be a cleaned input image 202.

In some examples, the vector line drawing network 200 initiates a canvas image 204 based on the input image 202, where the canvas image 204 is a blank canvas of equal size (e.g., equal pixel dimensions) to the input image size $W_I$.

In some examples, a dynamic drawing window 206 may be defined for the input image 202 and the canvas image 204 as a square window with a defined size W and a defined cursor position Q, where the cursor position is located at the center point of the dynamic drawing window 206. The dynamic drawing window 206 may be initialized at time t=1 with a random cursor position (x,y) and a default size (e.g., 128×128 pixels), with the cursor position and window predicted for every time step t thereafter. The position of the dynamic drawing window 206 may move around the input image 202 and canvas image 204 at each time step t to facilitate the generation of a vector line drawing 230, according to a stroke action 216. The dynamic drawing window 206 may also automatically resize at each time step t based on a scaling factor s.

The input image 202, canvas image 204 and dynamic drawing window 206 may be an input to the aligned cropping operator 208. The aligned cropping operator 208 may crop an image patch 210 from the input image 202 corresponding to the dynamic drawing window 206. The aligned cropping operator may also crop a canvas patch 212 from the canvas image 204 corresponding to the dynamic drawing window 206. The image patch 210 and the canvas patch 212 may be cropped according to the position of the dynamic drawing window cursor $Q_{t-1}$ and the dynamic drawing window size $W_{t-1}$, both of which may be floating-point numbers. To further describe the aligned cropping operator 208, FIG. 3A and FIG. 3B may be referenced.

FIG. 3A-3C provide examples of cropping and pasting operations, in accordance with examples of the present disclosure. FIG. 3A illustrates a naïve cropping operation with a quantized discrete window size that is not aligned with pixels of an image. Image or feature sampling based on a region of interest (ROI) with floating point number position and size is well known in the art, however existing techniques may introduce misalignment and may not enable gradient propagation. As shown in FIG. 3A, the image 300, in which individual pixel locations of the image are represented by the dashed grid, is desired to be cropped by a cropping window 302 represented by solid black lines, the position and size of the desired cropping window 302 defined by the cursor position Q and window size W. As can be seen, the desired cropping window 302 has a cursor position Q and a window size W that are not aligned with dashed lines of the pixels of image 300, for example, the solid black lines representing the desired cropping window 302 do not align with the dashed grid lines representing the pixel locations. The resulting cropped image 304 represented by the shaded grey region is misaligned from the intended ROI of the desired cropping window 302, and instead aligns with the pixels of the image 300.

To address the issue of misaligned cropping, an aligned cropping operator 208 may be used in the present disclosure that avoids quantization and permits gradient propagation. The aligned cropping operator 208 may include a RoIAlign operation to resample a patch to a fixed size $W_r$. An example RoIAlign operation that can be implemented in example embodiments is described in: He, Kaiming, et al. "Mask r-cnn," Proceedings of the IEEE international conference on computer vision, 2017, the entirety of which is hereby incorporated by reference. FIG. 3B illustrates an aligned cropping operation where a desired cropping window 302 is first sub-divided into spatial bins based on the dynamic drawing window size $W_{t-1}$ and the resampling size $W_r$. For example, as shown in FIG. 3B, the desired cropping window 302 is divided into 4 spatial bins denoted by solid black lines within the boundary of the desired cropping window 302. Bilinear interpolation is then performed within each bin to compute feature representations. In some examples, $W_r$ may be 128×128 pixels. Several sampling points 306 may be set inside each bin, for example, 4 sampling points 306 may be sampled within each bin, where the sampling points 306 do not align with the pixels of the image 300. To calculate the positions of the sampling points 306, bilinear image interpolation may be used to interpolate the value of each sampling point 306 from each corner of the nearest pixel of the image 300. In FIG. 3B, this interpolation process is shown by arrows 308 pointing from the corner of each pixel of image 300 to a corresponding sampling point 306. The computed sampling point values for each bin may be averaged to obtain final values. Using this approach, cropped image patches 210 and canvas patches 212 may be obtained that are aligned with the dynamic drawing window 206, without requiring quantization.

Returning to FIG. 2, the cropped image patch 210 and cropped canvas patch 212 may be provided as inputs to a stroke generator 214 to output a stroke action 216. A stroke action 216 may include a vector containing parameters for a predicted drawing stroke for a current time step in a series of time steps. The stroke action 216 may include a pen state parameter, which indicates whether the stroke is drawn in the canvas or whether the stroke is a movement of the dynamic drawing window 206 to a different region of the input image 202 without drawing the stroke in the canvas. To further describe the stroke generator 214, FIG. 4A and FIG. 4B may be referenced.

Figure 4A:
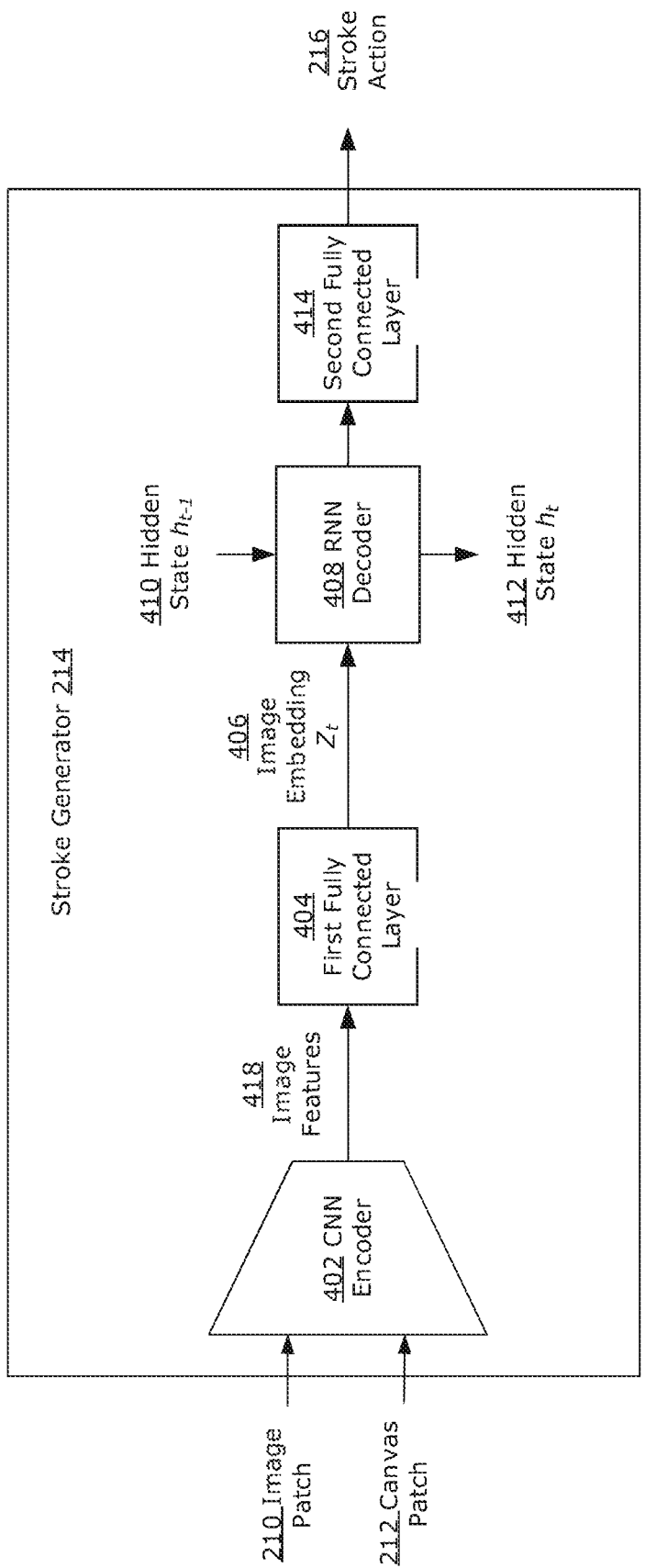
FIG. 4A is a block diagram illustrating an example architecture for a stroke generator, in accordance with examples of the present disclosure.

FIG. 4A is a block diagram illustrating an example architecture for a stroke generator 214, in accordance with examples of the present disclosure. In some examples, the stroke generator 214 may be a neural network including a CNN encoder 402 and an RNN decoder 408. For example, the CNN encoder 402 may behave as a feature extractor and extract the image-level information (e.g., in the form of image features 418) from the cropped image patch 210, and the RNN decoder 408 may process the image-level information and convert it into a stroke action 216 from which stroke parameters 220 may be computed.

FIG. 4B is a table representing an example architecture for a CNN encoder 402 within the stroke generator 214, in accordance with examples of the present disclosure. FIG. 4B indicates the neural network layers that may be used for the CNN encoder 402, in an example, from the input layer at the top row of the table to the output layer at the bottom row of the table. Each row of the table may represent a layer of the CNN encoder 402, where additional details about each layer, such as the layer type, kernel size, stride, normalization function, activation function and output size of each layer are indicated by the six columns of the table, respectively. The output of each layer, as indicated in the right-most column of each row may be input to the next layer in the row below. It should be understood that the architecture of the CNN encoder 402 may be different from the example discussed herein (e.g., with fewer or greater numbers of neural network layers, with different kernel size, different stride size, etc.).

In some examples, the CNN encoder 402 may include a first input layer, for example, including 10 channels. In some examples, the input layer may include information from the image patch 210, the canvas patch 212, the input image 202, the canvas image 204 and the cursor position Q. In some examples, the CNN encoder 402 may also include a second layer employing the CoordConv architecture. An example CoordConv architecture that can be implemented in example embodiments is described in: Liu, Rosanne, et al. "An intriguing failing of convolutional neural networks and the coordconv solution," arXiv preprint arXiv:1807.03247, 2018, the entirety of which is hereby incorporated by reference. Following the CoordConv layer, the CNN encoder 402 may include a series of convolution layers with instance normalization and using a ReLU activation function. An example of instance normalization that can be implemented in example embodiments is described in: Ulyanov, Dmitry et al. "Instance normalization: The missing ingredient for fast stylization," arXiv preprint arXiv: 1607.08022, 2016, the entirety of which is hereby incorporated by reference.

Returning to FIG. 4A, the CNN encoder 402 may output image features 418 in the form of feature maps or a feature representation (e.g., a feature map $\in \mathbb{R}^{512 \times 4 \times 4}$) In some examples, the image features 418 may then be flattened into a feature vector (e.g., a vector $\in \mathbb{R}^{8192}$). A first fully connected layer 404 may convert the feature vector to an image embedding (e.g., denoted as $z_t$, where $z_t \in \mathbb{R}^{128}$) 406, where an image embedding 406 may be a lower-dimensional representation of the image features 418.

In some examples, the image embedding 418 is fed into the RNN encoder 408 along with the previous hidden state 410 (from a previous time step t-1), denoted $h_{t-1}$ (e.g., $h_{t-1} \in \mathbb{R}^{256}$). Additional RNN inputs may also include the width factor for the previous time step t-1 $w_{t-1}$, which may be relevant for the prediction of $w_t$ since the end point of the stroke in the previous time step t-1 and the starting point of the stroke for the current time step t may form a shared drawing stroke. Additional RNN inputs may also include the cursor position for the previous time step t-1 $Q_{t-1}$, which may provide information to the RNN decoder 408 to avoid predicting a stroke action 216 that would result in a stroke outside of the full canvas. The additional RNN inputs may also include an upper and lower scaling boundary $\Delta S_{t-1}^{up} = W_{t-1}/W_f$ and $\Delta S_{t-1}^{bottom} = W_{t-1}/W_{min}$, which may provide information to the RNN decoder 408 to avoid predicting a scaling factor that would scale the dynamic drawing window 206 beyond the defined upper or lower boundary (e.g., to avoid a dynamic drawing window 206 that is too large or too small, which would impact the accuracy and smoothness of the generated vector line drawing).

In some examples, the RNN decoder 408 may include a long short-term memory (LSTM) network. An example LSTM architecture that can be implemented in example embodiments is described in: Hochreiter, Sepp, and Jurgen Schmidhuber, "Long short-term memory," Neural computation 9.8 (1997): 1735-1780, the entirety of which is hereby incorporated by reference. The output of the RNN decoder 408, which may be denoted $o_t$ (e.g., $o_t \in \mathbb{R}^{256}$) may be converted to a vector (e.g., a vector $\in \mathbb{R}^7$) by a second fully connected layer 414, and the resulting vector may be the stroke action 216 that is predicted by the stroke generator 214. The RNN decoder 408 may also output a new hidden state $h_t$ 412 for the current time step t, which may be fed back to the RNN decoder 408 for generating predictions for the next time step (i.e., for time step t+1).

Returning to FIG. 2, in some examples, the stroke action 216 may include a vector containing action parameters at that describe various positional and aesthetic elements of the predicted drawing stroke, positional elements of the virtual pen, and positional and size elements of dynamic drawing window 206 for time step t or time step t+1. The stroke action 216 may also include a pen state parameter p of the virtual pen, which indicates whether the predicted drawing stroke is drawn for time step t or whether the predicted drawing stroke is not drawn for time step t, and instead the predicted drawing stroke is a movement of the dynamic drawing window 206 to a different region of the input image 202. The action parameters at $a_t$ time step t within a coordinate system [−1, 1] may be defined as:

$$a_t = (\Delta_x, \Delta_y, x_c, y_c, w, \Delta s, p)_t t = 1, 2, \ldots, T \qquad (1)$$

where $(\alpha x, \Delta y) \in [-1, +1]^2$ describes an offset of the virtual pen in relation to the starting position of the virtual pen at time step t, where the starting position of the virtual pen at time step t (i.e. the starting position for a drawing stroke at time step t) may be the center point of the dynamic drawing window 206 and the offset of the virtual pen represents the ending position of the virtual pen at time step t after a predicted drawing stroke has been drawn. The ending position of the virtual pen at time step t may become the starting position of the virtual pen for time step t+1. $(x_c, y_c) \in [-1, +1]^2$ represents an intermediate control point positioned between the starting position of the virtual pen at time step t and the ending position of the virtual pen at time step t, that may be used to form a Bezier curve. $w \in [0, 1]$ is a width factor describing drawing stroke thickness. $\Delta s \in [0, k] (k > 1)$ is a scaling factor which describes the dynamic drawing window size at each time step and $p \in [0, 1]$ is a pen state parameter of the virtual pen to control whether the predicted drawing stroke is drawn or not drawn. If the stroke is not drawn, then the stroke action 216 may simply move the dynamic drawing window to a different location in the input image 202.

In some examples, the predicted drawing stroke is a curve, and the curve may be defined as a Bezier curve $B(\tau)$. A quadratic Bezier curve specified by three control points $P_0 = (x_0, y_0)$, $P_1 = (x_1, y_1)$ and $P_2 = (x_2, y_2)$ is formulated as:

$$B(\tau) = (1-\tau)^2 P_0 + 2(1-\tau)\tau P_1 + \tau^2 P_2, \tau \in [0, 1] \qquad (2)$$

In some examples, a parameter computation 218 may compute stroke parameters 220 $q_t = (x_0, y_0, x_1, y_1, x_2, y_2, r_0, r_2)_t$ for a quadratic Bezier curve. The stroke parameters 220 can be defined based on $a_t$:

$$(x_0, y_0)_t = (0, 0), (x_1, y_1)_t = (x_c, y_c)_t = (x_2, y_2)_t = (\Delta x, \Delta y)_t,$$
$$(r_0)_t = W_{t-1} \text{ and } (r_2)_t = w_t \qquad (3)$$

where the starting control point $(x_0, y_0)$ may be the center point of the dynamic drawing window 206, $(x_1, y_1)$ and $(x_2, y_2)$ are derived from the stroke action 216, and $r_0$ and $r_2$ denote the stroke widths at points $P_0$ and $P_2$.

In some examples, the width factor $w_t$ may describe the drawing stroke thickness for a predicted drawing stroke according to the stroke action 216. A vector line drawing may be represented as a plurality of consecutive drawing strokes, where the ending point of a drawing stroke from time step t-1 may equal the starting position for the drawing stroke at time step t. Accordingly, a width factor $w_t$ may be defined within the stroke action 216 that may or may not equal the width factor $w_{t-1}$ from the previous drawing stroke. Therefore, in generating the stroke parameters 220, the width $(r_0)_t$ of the drawing stroke at the starting position for the drawing stroke at time step t may equal the width factor $w_{t-1}$ of the stroke at time step t-1.

In some examples, due to the scaling factor, $\Delta s$ at each time step, the dynamic drawing window 206 may have different sizes at different time steps. As a relative value based on the dynamic drawing window size, when a width factor $w_{t-1}$ from time step t-1 is used to represent $r_0$ at time step t, the width factor $w_{t-1}$ may be scaled to adapt to the dynamic drawing window size at time step t by:

$$(r_0)_t = w'_{t-1} \quad (4)$$

Where $w'_{t-1}$ is the scaled width from time step t-1. The scaling process may be described by:

$$\hat{w}'_t = w_t \times \left(\frac{W_{t-1}}{W_t}\right), w'_t = \min(1.0, \hat{w}'_t) \quad (5)$$

Where W denotes the dynamic drawing window size and $\hat{}$ denotes the original values after relative scaling. A min operation performing value clipping may be adopted to avoid issues related to the dynamic drawing window 206 straying out of bounds. For example, initial values $w'_0$ may equal 0.01.

In some examples, the position of the virtual pen and the dynamic drawing window 206 may move at each time step, with the starting position of the virtual pen at time step t+1 and the center point of the dynamic drawing window at time step t+1 both equaling the ending position of the predicted drawing stroke at time step t. According to the stroke action 216, a situation may occur when a predicted drawing stroke at time step t is not drawn (for example, when the virtual pen state p=0) but it may be necessary to move the dynamic drawing window 206 to a different region of the input image 202 and define a new dynamic drawing window position and size accordingly. Such a situation may be referred to as "movement only." Similarly, the size of the dynamic drawing window 206 may be enlarged or reduced at each time step as described by as. Given the dynamic drawing window cursor movement $\Delta Q_t = (\Delta x, \Delta y)_t \in [-1, +1]^2$ and scaling factor $\Delta S_t$, a dynamic drawing window update rule can be defined as:

$$\hat{Q}_t = \Delta Q_t \times \frac{W_{t-1}}{2} + Q_{t-1}, Q_t = \max(0, \min(W_I, \hat{Q}_t)) \quad (6)$$

$$\hat{W}_t = \Delta s \times W_{t-1}, W_t = \max(W_{min}, \min(W_I, \hat{W}_t))$$

where $W_I$ is the size of the input image 202 and $W_{min}$ is a pre-defined minimum value for the dynamic drawing window size. Value clipping may be used to avoid issues with the dynamic drawing window 206 extending out-of-bounds. For example, $W_{min}$ may equal 32×32 pixels, an initial dynamic drawing window size $W_0$ may equal 128×128 pixels, an initial dynamic drawing window cursor position $Q_0$ may be set to a random position within the boundaries of the input image, and k may equal 2 for $\Delta s$, where $\Delta_s \in [0, k](k>1)$.

In some examples, a virtual pen state may be predicted as a continuous value between 0 and 1, but may be discretized to a discrete binary value corresponding to a next stroke action 216. For example, a virtual pen state value of 1 may correspond to a next stroke action 216 of predicting a drawing stroke, while a virtual pen state value of 0 may correspond to a next stroke action 216 of lifting the virtual pen, breaking the continuous stroke and moving the position of the dynamic drawing window to a different region of the image without predicting a drawing stroke. Discretization of the virtual pen state in a differentiable operation that enables gradient propagation (during training) may be achieved using the softargmax function. The softargmax operation can be formulated as:

$$softargmax(x) = \sum_i \frac{e^{\beta x_i}}{\sum_j e^{\beta x_j}} i, \quad (7)$$

where $$e^{y_i}/\sum_j e^{y_j}$$

is the standard softmax operation and $\Sigma_i z_i i$ is the expectation for the index of the maximum probability. $\beta$ is a hyperparameter controlling the smoothness of the softargmax. Adjusting $\beta$ may introduce a trade-off between index accuracy and gradient intensity, where a larger $\beta$ may reduce the size of the gradients. In some examples, $\beta$ may equal 10. The softargmax operation may output a virtual pen state value $p \in [0,1]$ closer to 0 or 1 when applied to a vector [1-p,p] that has index values of 0 and 1 only.

In some examples, the stroke parameters 220 may be input into a differentiable renderer 222 to render the predicted drawing stroke on to the canvas patch 212 to generate a rendered stroke image $S_t$ 224. The rendered stroke image 224 may be a 2D vector image defined by the Bezier curve $B(\tau)$ that approximates the drawing stroke contained within the image patch 210. The differentiable renderer 222 may be a CNN that facilitates end-to-end training with a raster level loss and enables raster only supervision, allowing gradients to be propagated from the rendered output to the stroke parameters 220. To further describe the differentiable renderer 222, FIG. 5A and FIG. 5B may be referenced.

Figure 5A:
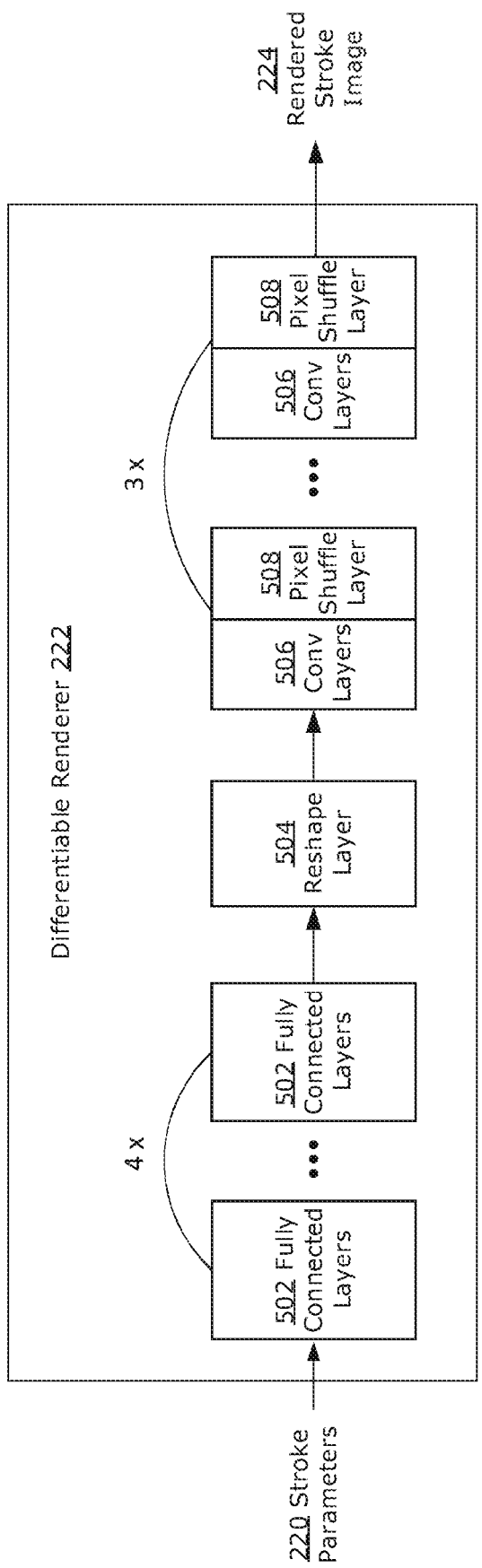
FIG. 5A is a block diagram illustrating an example architecture for a differentiable renderer, in accordance with examples of the present disclosure.

FIG. 5A is a block diagram illustrating an example architecture for a differentiable renderer 222, in accordance with examples of the present disclosure. It should be understood that the architecture of the differentiable renderer 222 may be different from the example discussed herein (e.g., with fewer or greater numbers of neural network layers). The design of the differentiable renderer 222 may be based on the neural renderer described in: Huang, Zhewei, et al. "Learning to paint with model-based deep reinforcement learning," Proceedings of the IEEE/CVF International Conference on Computer Vision, 2019, the entirety of which is hereby incorporated by reference. For example, the architecture of the differentiable renderer 222 may include four fully connected layers 502 employing a ReLU activation function, followed by a reshape layer 504. The differentiable renderer 222 may then include a series of two convolutional layers 506 with a ReLU activation function followed by a pixel shuffle layer which may combine multiple channels of the feature maps generated by the convolutional layers 506 to increase the resolution of the rendered drawing strokes. The series of two convolutional layers 506 followed by the pixel shuffle layer 508 may be repeated twice for a total of six convolutional layers 506 and three pixel shuffle layers 508. The final pixel shuffle layer 508 may employ a sigmoid activation function. The rendered stroke image 224 may be output with dimensions of 128×128.

FIG. 5B is a table representing an example architecture for a differentiable renderer 222, in accordance with examples of the present disclosure. FIG. 5B indicates the neural network layers that may be used for the differentiable renderer 222, in an example, from the input layer at the top row of the table to the output layer at the bottom row of the table. Each row of the table may represent a layer of the differentiable renderer 222, where additional details about each layer, such as the layer type, kernel size, activation function and output size of each layer are indicated by the four columns of the table, respectively. The output of each layer, as indicated in the right-most column of each row may be input to the next layer in the row below. It should be understood that the architecture of the differentiable renderer 222 may be different from the example discussed herein (e.g., with fewer or greater numbers of neural network layers, with different kernel size, different activation function, etc.).

Returning to FIG. 2, the rendered stroke image 224 may be pasted into the canvas image 204 by a differentiable pasting operator 226, to generate an aligned canvas 228. To further describe the differentiable pasting operator 226, FIG. 3C may be referenced.

FIG. 3C illustrates a differentiable pasting operation. Similar to the aligned cropping operator 208, the differentiable pasting operator 226 aims to guarantee alignment of the rendered stroke image 224 when it is pasted into the canvas image 204, while enabling gradient propagation (during training) to the dynamic drawing window cursor position Q and dynamic drawing window size W. In other words, the cropping operator 208 crops a canvas patch 212 from the canvas image 204 based on the size and position of the dynamic drawing window 206, and the differentiable pasting operator 226 pastes the cropped canvas patch 212 (as the rendered stroke image 224) back into the canvas image 202 also based on the dynamic drawing window 206, to generate the aligned canvas 228. In examples, the size and position of the pasted rendered stroke image 224 in the aligned canvas 228 matches the size and position of the canvas patch 212 that was initially cropped from the canvas image 202.

In some examples, the differentiable pasting 226 is based on bilinear image interpolation. Similar to the aligned cropping operator 208 described with respect to FIG. 3B, the aligned pasting operator 226 may include a RoIAlign operation to resample the rendered stroke image 224. A boundary 310 (denoted by solid black lines) may be defined for the canvas image 202, where the boundary 310 aligns with pixels in the canvas image 202, and where each smaller square within the boundary 310 represents a pixel. A pasting boundary 312 (denoted by dashed lines) corresponding to the rendered stroke image 224 to be pasted, is defined within the boundary 310. The pasting boundary 312 may be sub-divided into spatial bins (for example, four bins denoted by dashed lines). Sampling points 314 may be set inside pixels of the boundary 310, and bilinear interpolation may be performed for the sample points within each bin of the pasting window 312 to compute feature representations. Several sampling points 314 may be set inside each pixel. To calculate the positions of the sampling points 314, bilinear image interpolation may be used to interpolate the value of each sampling point 314 from each corner of the nearest bin of the pasting window 312. In FIG. 3C, this interpolation process is shown by arrows 316 pointing from the corner of each bin of pasting window 312 to a corresponding sampling point 314. The computed sampling point values for each bin may be averaged to obtain final values.

In some examples, before a pasting window can be sub-divided into spatial bins based on the dynamic drawing window size $W_{t-1}$ and the resampling size $W_r$, a coordinate system change may be required, as the aligned cropping 208 and differentiable pasting 226 may operate under different coordinate systems. For example, the base image space used during aligned cropping 208 may be described as coordinate system Coord, and the image space for the rendered (or cropped) image space may be described as Coord'. Similarly, win1 may represent the solid cropping window lines depicted by cropping window 302 in FIG. 3B while wing may represent the solid lines depicted by boundary 310 in FIG. 3C. For example, the size $W_{win1}$ may equal 3.7 and the size $W'_{win2}$ may equal 2. In some examples, $W'_{win2}=W_r$.

In aligned cropping 208, the cropping operation depends on a defined size W and a defined cursor position Q, for example ($Q_{win1}$, $W_{win1}$) from cropping window win1 under the base coordinate system Coord. During a differentiable pasting operation 226, a similar defined size W and defined cursor position Q may be required for the pasting window wing, for example ($Q'_{win2}$, $W'_{win2}$) under coordinate system Coord'. In some examples, obtaining ($Q'_{win2}$, $W'_{win2}$) under coordinate system Coord' may be accomplished by computing ($Q_{win2}$, $W_{win2}$) under coordinate system Coord, and the converting to coordinate system Coord' using the following equations:

$$P^\nwarrow_{win1} = Q_{win1} - \frac{W_{win1}}{2.0}, P^\searrow_{win1} = Q_{win1} + \frac{W_{win1}}{2.0}, \quad (8)$$

where $P^\nwarrow_{win1}$ is the position of the top-left corner of win1 and $P^\searrow_{win1}$ is the position of the bottom-right corner of win1 under coordinate system Coord.

$$P^\nwarrow_{win2} = \lfloor P^\nwarrow_{win1} \rfloor, P^\searrow_{win2} = \lceil P^\searrow_{win1} \rceil \quad (9)$$

where $P^\nwarrow_{win2}$ is the position of the top-left corner of wing and $P^\searrow_{win2}$ is the position of the bottom-right corner of wing under coordinate system Coord, and where win2 is the bounding box of the rendered stroke image 224 within win1 (for example, where the rendered stroke image 224 to be pasted is represented by the dashed lines of the pasting window 312).

$$Q_{win2} = \frac{(P^\nwarrow_{win2} + P^\searrow_{win2})}{2.0}, W_{win2} = P^\searrow_{win2} - P^\nwarrow_{win2}, \quad (10)$$

where $Q_{win2}$ is the defined cursor position for win2 and $W_{win2}$ is the defined window size for win2 under coordinate system Coord.

$$Q'_{win2} = \left(\frac{W'_{win1}}{W_{win1}}\right) \times (Q_{win2} - P^\nwarrow_{win1}), \quad (11)$$

$$W'_{win2} = \left(\frac{W'_{win1}}{W_{win1}}\right) \times W_{win2}, \quad (12)$$

where $Q'_{win2}$ is the defined cursor position for win2 and $W'_{win2}$ is the defined window size for wing under coordinate system Coord'.

Returning to FIG. 2, in some examples, once the defined window size W and a defined cursor position Q of wing is obtained, differentiable pasting 226 can proceed in the same way as an aligned cropping 208 process, with the rendered stroke image 224 being pasted into the canvas image 204 to obtain the aligned canvas 228.

In some examples, the stroke action 216 may be evaluated to determine whether the predicted drawing stroke for time step t is to be drawn or not drawn. In this way, the pen state parameter p 232 may act as a multiplier. Depending on the pen state 232, the aligned canvas 228 may be added into the canvas image from the previous time step t-1 (i.e. Canvas$_{t-1}$ 234) in the region defined by the dynamic drawing window 206 to update the canvas image 204 for time step t+1. The vector line drawing network 200 will continue to process the input image 202 for the next time step t+1. In some examples, if the pen state 232 indicates that the stroke is not drawn (i.e., the defined window position and defined window size of the dynamic drawing window 206 are to undergo "movement only", moving to a different region of the input image 202 for the next time step t+1), the aligned canvas 228 may not be added into Canvas$_{t-1}$ 234 and update the canvas image 204 for time step t+1.

In some examples, after a series of time steps, for example, after a set number of drawing iterations, the canvas image 204 may sufficiently resemble the input image 202 and a convergence condition may be satisfied. In some examples, the number of drawing iterations may be determined through experimentation. In other examples, evaluation of the pen state may be used to indicate when a drawing round has ended, for example, if the pen state p repeatedly returns a value of 0 a specified number of times, this may suggest that drawing has completed and the cursor is continuously moving to new random locations. The vector line drawing network may then output a generated vector line drawing 230.

Figure 6:
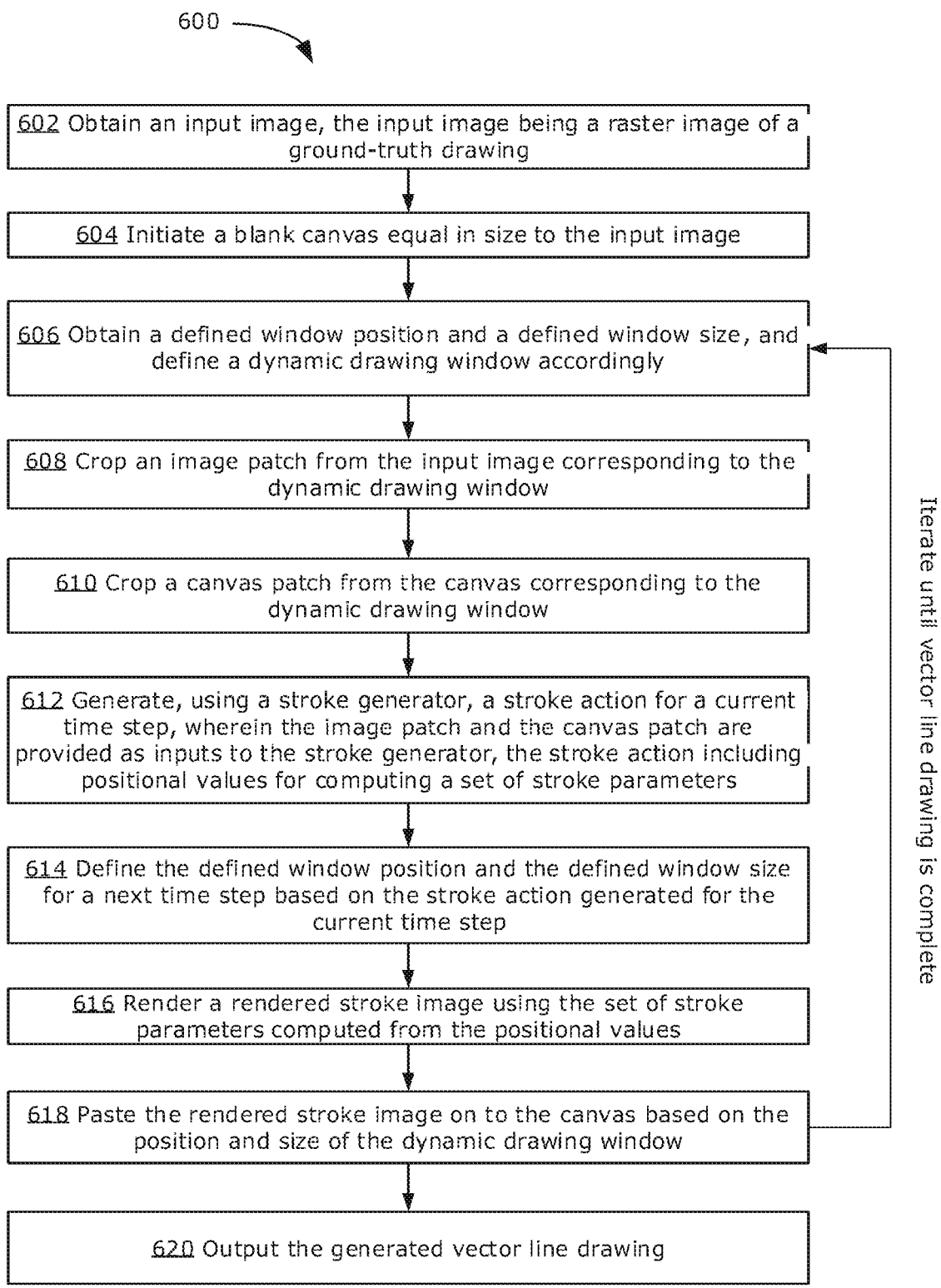
FIG. 6 is a flowchart illustrating an example method for generating vector line drawings, in accordance with examples of the present disclosure.

FIG. 6 is a flowchart illustrating an example method 600 for generating vector line drawings, in accordance with examples of the present disclosure. The method 600 may be performed by the computing system 100. For example, the processor 102 may execute computer readable instructions (which may be stored in the memory 116) to cause the computing system 100 to perform the method 600. The method 600 may be performed using a single physical machine (e.g., a workstation or server), a plurality of physical machines working together (e.g., a server cluster), or cloud-based resources (e.g., using virtual resources on a cloud computing platform).

Method 600 begins with step 602 in which an input image 202 is obtained, the input image being a raster image. The input image 202 may be captured by a camera 108 or a scanner 110 on the computing system 100 or may be a digital image taken by another camera or scanned by another scanner on another electronic device and communicated to the computing system 100.

At step 604, a blank canvas image 204 may be initiated, where the canvas image 204 is of equal size to the input image 202.

At step 606, a defined window position and a defined window size may be obtained, where the defined window position and a defined window size may define a dynamic drawing window 206. The defined window position may be defined by a cursor position Q, the cursor position being located at the center point of the dynamic drawing window 206.

At step 608, an image patch 210 may be cropped from the input image 202 corresponding to the dynamic drawing window 206. Similarly, at step 610, a canvas patch 212 may be cropped from the canvas image 204 corresponding to the dynamic drawing window 206. The image patch 210 and canvas patch 212 may be cropped by an aligned cropping operator 208 in order to maintain alignment with the dynamic drawing window 206, without requiring quantization.

In some examples, to facilitate aligned cropping 208, a cropping window 306 may be defined according to the dynamic drawing window 206. The cropping window may be sub-divided into spatial bins based on the defined dynamic drawing window size $W_{t-1}$ and the resampling size $W_r$ and several sampling points 308 may be set inside each bin. The values of the sampling points 308 may be computed by bilinear image interpolation. The computed values for each bin may be averaged to obtain final values. Cropped image patches 210 and canvas patches 212 may then be obtained that are aligned with the dynamic drawing window 206, without requiring quantization.

At step 612, a stroke generator 214, using the image patch 210 and the canvas patch 212 as inputs, may generate a stroke action 216 for a current time step t. A stroke action 216 may include a vector containing parameters for a predicted drawing stroke and a dynamic drawing window for a current time step t in a series of time steps. For example, the stroke action may describe aspects of the dynamic drawing window 206 at a next time t+1, including a scaling factor which may be used to define a size of the dynamic drawing window 206 at a next time t+1 and a positional value which may be used to define a window position of the dynamic drawing window at a next time t+1. The stroke action 216 may also include a pen state parameter, which indicates whether the predicted drawing stroke is drawn in the canvas or whether the predicted drawing stroke is a movement of the dynamic drawing window 206 to a different region of the input image 202 without drawing the stroke in the canvas. The stroke action 216 may also include positional values for computing a set of stroke parameters 220.

At step 614, a defined window position and a defined window size may be obtained for a next time step t+1, based on the stroke action 216 generated for the current time step t. A set of stroke parameters 220 may be computed that describe aspects of the predicted drawing stroke at a current time step t, including positional information for a predicted drawing stroke and line thickness of the predicted drawing stroke.

At step 616, a rendered stroke image 224 may be rendered by a differential renderer 222, using the set of stroke parameters 220 computed from the positional values. The stroke parameters 220 may describe a quadratic Bezier curve which the differential renderer 222 may use as an input to render a rendered stroke image 224. The rendered stroke image 224 may be a 2D raster image that approximates the drawing stroke contained within the image patch 210.

At step 618, the rendered stroke image 224 may be pasted in to the canvas image 204 using a differentiable pasting operator 226, based on the position and size of the dynamic drawing window 206. In some examples, pasting the rendered stroke image 224 first requires that a secondary coordinate system be defined for the rendered stroke image 224. The rendered stroke image 224 may then be resampled into spatial bins based on the size of the dynamic drawing window 206 and a resampling size. A number of sampling points may be set inside each bin and values for each sampling point may be computed by bilinear image interpolation to inform the differentiable pasting operator 226 of where to paste the rendered stroke image 224 into the canvas.

Over a series of time steps, steps 608 through 618 may be repeated until a convergence condition is satisfied and the full-resolution vector line drawing 230 is sufficiently generated at step 620. In some examples, as each predicted stroke is generated, rendered and pasted into the canvas image 204 at a respective time step, the order in which the predicted drawing strokes are generated and pasted into the canvas image may be determined. The order in which the strokes are generated and added to the canvas image may be stored, in some examples.

In some examples, the full-resolution vector line drawing 230 may be outputted to an application on an electronic device (e.g., a software application executed by the computing system 100) to be further edited. For example, the application on the electronic device may be a vector illustration software. In another example, the application on the electronic device may be an animation software. In some examples, the vector line drawing 230 may be outputted to be viewable by a user (e.g., displayed by an output device 112 of the computing system 100). In some examples, the vector line drawing 230 may be stored (e.g., in the memory 116 of the computing system 100) to be edited and/or viewed at a later time.

In some examples, the vector line drawing network 200, including the aligned cropping 208, the stroke generator 214, the differentiable renderer 222 and the differentiable pasting 226 may be trained end-to-end as one network using supervised learning. Training datasets may include images from the QuickDraw dataset, where the training images may be rendered raster images of varying resolutions from 128 px to 278 px. The QuickDraw dataset that can be implemented in example embodiments is described in: Ha, David, and Douglas Eck, "A neural representation of sketch drawings," arXiv preprint arXiv:1704.03477 (2017), the entirety of which is hereby incorporated by reference. In other examples, training datasets may also include simulated rough sketch images simulated from clean line drawings using rough augmentation techniques. An example rough augmentation technique that can be implemented in example embodiments is described in: Simo-Serra, Edgar et al. "Real-time data-driven interactive rough sketch inking," ACM Transactions on Graphics (TOG) 37.4 (2018): 1-14, the entirety of which is hereby incorporated by reference.

In some examples, a training loss function may be computed at each time step in model training. In some examples, a training loss function may comprise three components: (1) a raster loss $L_{ras}$ for visual supervision, (2) an out-of-bounds penalty loss $L_{out}$ to avoid out-of-bounds issues of the stroke parameters with relative moving and scaling, and (3) a stroke regularization loss $L_{reg}$ to encourage the model to simplify the resulting stroke vector drawings. The total loss may be formulated by:

$$L_{total} = L_{ras} + \lambda_{out} L_{out} + \lambda_{reg} L_{reg}, \quad (13)$$

where $\lambda_{out}$ and $\lambda_{reg}$ are scalar weights for the out-of-bounds loss and the regularization loss, respectively. The values of $\lambda_{out}$ and $\lambda_{reg}$ may be selected, for example to achieve a desired balance between speed of learning (e.g., number of training rounds required for the weights of the vector line drawing network 200 to converge) and accuracy.

In some examples, a perceptual difference may be used as a raster-level loss for end-to-end training. Given a rendered line drawing image $\hat{y}$ (for example, a canvas image 204 from a previous time step t-1), a target line drawing image y (for example, an input image 202), and a pre-trained perceptual network $\phi$, an output activation map $\in \mathbb{R}^{D_j \times H_j \times W_j}$ of each layer j can be defined as $\phi_j(\cdot)$ and compared to the rendered image and target image. The perceptual loss of layer j may be defined as:

$$\mathcal{L}_{perc}^{j} = \frac{1}{D_j \times H_j \times W_j} \|\phi_j(\hat{y}) - \phi_j(y)\|_1, \quad (14)$$

In some examples, the raster loss value computed for each layer may be normalized for each layer by dividing the loss value of layer j by the mean loss calculated from all of the previous training iterations, to obtain a normalized perceptual loss $L_{perc-norm}^{j}$. Accordingly, a raster loss may be defined by:

$$\mathcal{L}_{ras} = \sum_{j \in J} \mathcal{L}_{perc-norm}^{j}, \quad (15)$$

In some examples, an out-of-bounds penalty may be introduced to encourage the stroke generator 214, when predicting stroke offsets ($\Delta x$, $\Delta y$) and scaling factors $\Delta s$, to predict relative values that are within the boundaries of the input image 202. An out-of-bounds penalty loss related to movement of the dynamic drawing window 206 may be computed by:

$$\mathcal{L}_{out}^{moving} = \frac{1}{T}\sum_{t=1}^{T} |Q_t - \hat{Q}_t|, \quad (16)$$

In some examples, a penalty for the scaling factor may be computed as the normalized outer distance to the upper ($W_I$) and bottom ($W_{min}$) bounds by:

$$\mathcal{L}^{up} = \frac{\max(\hat{W}_t - W_I, 0)}{W_I}, \quad (17)$$

$$\mathcal{L}^{bottom} = \frac{\max(W_{min} - \hat{W}_t, 0)}{W_{min}}, \quad (18)$$

$$\mathcal{L}_{out}^{scaling} = \frac{1}{T}\sum_{t=1}^{T}(\mathcal{L}^{up} + \mathcal{L}^{bottom}), \quad (19)$$

In some examples, a total out-of-bounds penalty Lout may be the combination of losses for moving and scaling factors, for example:

$$L_{out} = L_{out}^{moving} + L_{out}^{scaling} \quad (20)$$

In some examples, a stroke regularization mechanism may be introduced to encourage simplicity in the vector line drawing network 200, where the stroke regularization term is proportional to the number of drawn strokes and aims to minimize the number of drawing strokes by encouraging the production of longer drawing strokes over shorter drawing strokes and discouraging the production of redundant drawing strokes. The stroke regularization mechanism may be related to the virtual pen state by:

$$\mathcal{L}_{reg} = \frac{1}{T}\sum_{t=1}^{T} p_t, \quad (21)$$

The presently disclosed vector line drawing network 200 includes components that are differentiable, as discussed above, to enable training using the above defined loss computations. In particular, because the vector line drawing network 200 is differentiable, the weights of the neural network layers may be learned using gradient computation and backpropagation techniques. As an added benefit to using a differentiable renderer 222 to create a fully differentiable network, the disclosed vector line drawing network 200 may be trained using raster images as training data, without the need for ground-truth vector line drawings associated with each raster image. Typically, a network trained to generate vector line drawings do not include a differentiable renderer, and are required to learn vector parameters of the image instead of the final image. By incorporating a differentiable renderer in the network, loss functions as described above can be applied to raster images directly during training, to enable the network to learn to render final raster images.

During training, some outputs from the previous time step t-1 may be used as inputs for the current step time t (e.g., canvas C, window cursor position Q, etc.). To avoid recursive gradient back-propagation for some inputs, the gradients of all of the inputs to the CNN encoder 402 and any additional inputs to the RNN decoder 408 may be broken. Gradient breaking may also be performed when updating the window cursor position $Q_t$ and window size $W_t$ associated with the dynamic window update rule (equation X), where it may not be beneficial to propagate gradients recursively from $Q_t$ and $W_t$ to $Q_{t-1}$ and $W_{t-1}$.

During training, the model may encounter a situation where the cropped patch is fully drawn and needs to move to an undrawn region outside of the window. To facilitate the model learning where undrawn regions may be, additional inputs may be provided to the CNN encoder 402 as global guidance that tells the model where undrawn strokes may be located. The input image 202 and canvas image 204 may be resized to generate a resized input image and a resized canvas image. For example, the size of the resized input image and the resized canvas image may equal $W_r$ and be 128×128 pixels (e.g. the resized input image and resized canvas image may be the same size as the cropped image patch 210 and cropped canvas patch 212). The resized input image and the resized canvas image may then be fed into the CNN encoder 402.

The present disclosure has described examples in the context of generating vector line drawings from raster images captured on a digital camera or by a scanner. It should be understood that the present disclosure may be applicable to vector line generation from both static 2D and 3D images (e.g., photographs, rough sketches) and video images (e.g. animations, videos).

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method of generating vector line drawings comprising:
   obtaining an input image, the input image being a raster image of a ground-truth drawing;
   initiating a blank canvas image equal in size to the input image;
   using a vector line drawing network, generating a vector line drawing over a series of time steps by, for each time step in the series of time steps:
      obtaining a defined window position and a defined window size and defining a dynamic drawing window accordingly;
      obtaining an image patch from the input image;
      obtaining a canvas patch from the canvas image;
      the image patch and the canvas patch being obtained from the input image and the canvas image, respectively, based on the defined window position and defined window size of the dynamic drawing window, by:
         resampling the dynamic drawing window into spatial bins based on the defined window size of the dynamic drawing window and a resampling size;
         setting sampling points inside each bin;
         computing values for the sampling points by bilinear image interpolation; and
         extracting the image patch and the canvas patch from the input image and the canvas image, respectively;
      generating, using a stroke generator, a stroke action for a current time step, wherein the image patch and the canvas patch are provided as inputs to the stroke generator, the stroke action including positional values for computing a set of stroke parameters;
      defining the defined window position and the defined window size for a next time step based on the stroke action generated for the current time step;
      rendering a rendered stroke image using the set of stroke parameters computed from the positional values; and pasting the rendered stroke image on to the canvas image based on the position and size of the dynamic drawing window; and outputting the generated vector line drawing.

2. The method of claim 1, wherein the stroke action for the current time step is a vector containing one or more action parameters for a predicted drawing stroke for the current time step in the series of time steps, the action parameters including at least one of:
  an offset with respect to a current position of a virtual pen;
  an intermediate control point;
  a width factor, the width factor describing the line thickness for the predicted drawing stroke;
  a scaling factor, the scaling factor defining the defined size of the dynamic window; or
  a pen state parameter of the virtual pen.

3. The method of claim 2, wherein the pen state parameter indicates whether the predicted drawing stroke is drawn in the canvas or whether the predicted drawing stroke is a movement of the dynamic drawing window to a different region of the input image without drawing the predicted drawing stroke in the canvas.

4. The method of claim 3, wherein the predicted drawing stroke is a curve, the curve defined by one or more stroke parameters computed from the stroke action.

5. The method of claim 1, wherein pasting the rendered stroke image on to the canvas image based on the position and size of the dynamic drawing window comprises:
  defining a secondary coordinate system for the rendered stroke image;
  resampling the rendered stroke image into spatial bins based on the size of the dynamic drawing window and a resampling size;
  setting sampling points inside each bin;
  computing values for the sampling points by bilinear image interpolation; and
  pasting the resampled rendered stroke image on to the canvas image.

6. The method of claim 5, wherein the vector line drawing network is a recurrent neural network, the recurrent neural network producing a plurality of consecutive drawing strokes, the consecutive drawing strokes being ordered by the order in which a respective rendered stroke image is pasted on to the canvas image.

7. The method of claim 1, wherein end-to-end training of the vector line drawing network includes the calculation of an overall loss function, the overall loss function comprising at least one of:
  the raster loss for visual raster-only supervision;
  an out-of-bounds penalty loss; or
  a stroke regularization loss.

8. The method of claim 7, wherein calculating the raster loss includes the calculation of a normalized perceptual loss function, the perceptual loss function comparing a rendered line drawing and the target line drawing for a set of layers associated with a differentiable renderer.

9. The method of claim 7, wherein calculating the stroke regularization loss includes calculating a stroke regularization term, the stroke regularization term being proportional to the number of drawn strokes, the stroke regularization loss acting to minimize the total number of drawn strokes by encouraging the production of longer drawing strokes over shorter drawing strokes and discouraging the production of redundant drawing strokes.

10. A device for generating vector line drawings, the device comprising a processor configured to execute instructions to cause the device to:

obtain an input image, the input image being a raster image of a ground-truth drawing;
initiate a blank canvas image equal in size to the input image;
using a vector line drawing network, generate a vector line drawing over a series of time steps by, for each time step in the series of time steps:
  obtain a defined window position and a defined window size and defining a dynamic drawing window accordingly;
  obtain an image patch from the input image;
  obtain a canvas patch from the canvas image;
  the image patch and the canvas patch being obtained from the input image and the canvas image, respectively, based on the defined window position and defined window size of the dynamic drawing window, by:
    resampling the dynamic drawing window into spatial bins based on the defined window size of the dynamic drawing window and a resampling size;
    setting sampling points inside each bin;
    computing values for the sampling points by bilinear image interpolation; and
    extracting the image patch and the canvas patch from the input image and the canvas image, respectively;
  generate, using a stroke generator, a stroke action for a current time step, wherein the image patch and the canvas patch are provided as inputs to the stroke generator, the stroke action including positional values for computing a set of stroke parameters;
  define the defined window position and the defined window size for a next time step based on the stroke action generated for the current time step;
  render a rendered stroke image using the set of stroke parameters computed from the positional values; and
  paste the rendered stroke image on to the canvas image based on the position and size of the dynamic drawing window; and
output the generated vector line drawing.

11. The device of claim 10, wherein the stroke action for the current time step is a vector containing one or more action parameters for a predicted drawing stroke for the current time step in the series of time steps, the action parameters including at least one of:
  an offset with respect to a current position of a virtual pen;
  an intermediate control point;
  a width factor, the width factor describing the line thickness for the predicted drawing stroke;
  a scaling factor, the scaling factor defining the defined size of the dynamic window; or
  a pen state parameter of the virtual pen.

12. The device of claim 11, wherein the pen state parameter indicates whether the predicted drawing stroke is drawn in the canvas or whether the predicted drawing stroke is a movement of the dynamic drawing window to a different region of the input image without drawing the predicted drawing stroke in the canvas.

13. The device of claim 12, wherein the predicted drawing stroke is a curve, the curve defined by one or more stroke parameters computed from the stroke action.

14. The device of claim 10, wherein in pasting the rendered stroke image on to the canvas image based on the position and size of the dynamic drawing window, the processor is further configured to execute the instructions to cause the device to:

define a secondary coordinate system for the rendered stroke image;

resample the rendered stroke image into spatial bins based on the size of the dynamic drawing window and a resampling size;

set sampling points inside each bin;

compute values for the sampling points by bilinear image interpolation; and paste the resampled rendered stroke image on to the canvas image.

15. The device of claim 10, wherein end-to-end training of the vector line drawing network includes the calculation of an overall loss function, the overall loss function comprising at least one of:

the raster loss for visual raster-only supervision;

an out-of-bounds penalty loss; or a stroke regularization loss.

16. The device of claim 15, wherein calculating the raster loss includes the calculation of a normalized perceptual loss function, the perceptual loss function comparing a rendered line drawing and the target line drawing for a set of layers associated with a differentiable renderer.

17. The device of claim 15, wherein calculating the stroke regularization loss includes calculating a stroke regularization term, the stroke regularization term being proportional to the number of drawn strokes, the stroke regularization loss acting to minimize the total number of drawn strokes by encouraging the production of longer drawing strokes over shorter drawing strokes and discouraging the production of redundant drawing strokes.

18. A non-transitory computer readable medium storing instructions thereon, wherein the instructions, when executed by a processing unit of a device, cause the device to:

generate vector line drawings, comprising:

obtaining an input image, the input image being a raster image of a ground-truth drawing;

initiating a blank canvas image equal in size to the input image;

using a vector line drawing network, generating a vector line drawing over a series of time steps by, for each time step in the series of time steps:

obtaining a defined window position and a defined window size and defining a dynamic drawing window accordingly;

obtaining an image patch from the input image;

obtaining a canvas patch from the canvas image;

the image patch and the canvas patch being obtained from the input image and the canvas image, respectively, based on the defined window position and defined window size of the dynamic drawing window, by:

resampling the dynamic drawing window into spatial bins based on the defined window size of the dynamic drawing window and a resampling size;

setting sampling points inside each bin;

computing values for the sampling points by bilinear image interpolation; and extracting the image patch and the canvas patch from the input image and the canvas image, respectively;

generating, using a stroke generator, a stroke action for a current time step, wherein the image patch and the canvas patch are provided as inputs to the stroke generator, the stroke action including positional values for computing a set of stroke parameters;

defining the defined window position and the defined window size for a next time step based on the stroke action generated for the current time step;

rendering a rendered stroke image using the set of stroke parameters computed from the positional values; and pasting the rendered stroke image on to the canvas image based on the position and size of the dynamic drawing window; and outputting the generated vector line drawing.

* * * * *